United States Patent [19]

Uemura et al.

[11] 4,244,414

[45] Jan. 13, 1981

[54] RADIAL TIRES FOR HEAVY DUTY VEHICLES

[75] Inventors: Yukihisa Uemura, Oji; Shoji Miyoshi, Nakamiya, both of Japan

[73] Assignee: The Toyo Rubber Industry Co., Ltd., Osaka, Japan

[21] Appl. No.: 971,832

[22] Filed: Dec. 19, 1978

[30] Foreign Application Priority Data

Dec. 19, 1977 [JP] Japan .................................. 52-153341

[51] Int. Cl.³ ................................................ B60C 9/08
[52] U.S. Cl. ............................ 152/354 R; 152/357 R; 152/359; 152/362 R
[58] Field of Search ............... 152/354, 356, 357, 359, 152/361, 362, 362 CS

[56] References Cited

U.S. PATENT DOCUMENTS

| | | | |
|---|---|---|---|
| 3,090,417 | 5/1963 | Spelman | 152/354 |
| 3,245,454 | 4/1966 | Lewis | 152/354 |
| 3,690,362 | 9/1972 | Mago | 152/359 |
| 3,964,533 | 6/1976 | Arimura et al. | 152/362 R |
| 4,019,551 | 4/1977 | Kolowski et al. | 152/354 |
| 4,046,183 | 9/1977 | Takahashi et al. | 152/362 R |

*Primary Examiner*—John E. Kittle
*Attorney, Agent, or Firm*—Wenderoth, Lind & Ponack

[57] ABSTRACT

A radial tire for heavy duty use in vehicles. The tire has a carcass having a two-ply structure using polyester cords of more than 4500d as the ply cords. The spacing of the cords between the first and second plies at approximately the maximum tire width, is nearly 1.2–1.7 times as large as cord diameter. The edge portions of the ply cords turned up around bead cores are coated with the same rubber as ply coating rubber, an extension of the edge covering rubber from the edge of the ply cords is three times or more as large as cord diameter.

2 Claims, 13 Drawing Figures

RADIAL TIRES FOR HEAVY DUTY VEHICLES

BACKGROUND OF THE INVENTION

1. Field of the Invention

This invention is directed to an improved radial tires for use in high pressure, heavy duty trucks and buses, and more particularly to an improvement in durability of the carcass plies therein.

2. Prior Art

Carcass plies of conventional radial tires for use in high pressure, heavy duty trucks and buses are normally made of steel cords which frequently rust undesirably. In other words, there are many faults created. Steel cords rust due to penetration of moisture through injuries to the tire surface. In long-term service, air which is within and inflates the tire can penetrate into the carcass ply layer through the internal wall of the tire and thereby oxidize the steel cords together with the moisture in the air so as to cause rusting. Therefore the conventional radial tires have the disadvantages that there is possible a reduction in strength of the steel cords and an adhesion of the carcass to the coating rubber.

Furthermore, the carcass ply cords suffers repeated deformation during tire running, relative movement of respective filaments of the steel cords occur which cause localized abrasions therein. Due to repeated deformation, material fatigue is increasingly accumulated so that the strength of the cords is decreased and becomes unable to endure the internal tire pressure. This results in locally disconnected steel cords, destruction or separation of the carcass ply, and so on.

Thus, it is preferable to use textile cords. Textile materials generally used for the carcass ply cords are rayon, nylon (polyamide), polyester and so forth. Of these cords, the rayon cords are not desirable because of a significant reduction in a strength and deterioration due to moisture under high pressure and heavy duty conditions in long-term service. While the nylon cords usually employed for bias tires assure good cord strength, adhesion to the rubber compound and fatigue resistance, they are often likely to stretch due to tension caused by the internal pressure. When the nylon cords are used for radial tires, particularly when a steel belt is located circumferentially to prevent the tire from stretching in the radial direction of tire, stretching of the nylon cords results in an execessive increasee of tire width for high pressure, long-term-use in trucks and buses. In the case of a dual wheel drive, such an excessive increase of tire width permits the sidewalls of the tires to come in contact with each other. To prevent such side contact, tires are vulcanized with a mold having a somewhat narrower width, taking account of an appropriate tire width at the air pressure charging. However, since there is an appreciable difference in tire width between vulcanization-molding and at air pressure charging, separation occurs at the edge of the steel belt located at the shoulders of the tires which are subject to heavy deformation. Accordingly, the nylon cords are suitable for use in bias ply tires but not for radial tires or for use under high pressure in heavy duty trucks and buses. The polyester cords sharply contrast to the above described cords in that the polyester has satisfactory fatigue resistance against repeated deformation and is hardly affected by moisture. Further, the stretching of polyester cords is about half that of the nylon cords. The polyester cords are most preferably used in heavy duty radial tires.

Therefor, the present invention is directed to using polyester cords to form the carcass plies. Further, the present invention is directed to other factors for enhancing durability of the described polyester cords.

Careful attention is first directed to problems which are associated with the number of plies within the carcass. In the case that the carcass has a multiple ply structure, there will result differences in the tension of the inner and outer ply cords due to the internal air pressure. This causes further non-uniformity in strength, adhesion and other properties of the respective cords and thus accelerates a decline in strength, adhesion, etc., of the tire as a whole. It has been shown that strength and adhesion decline more and more when the vehicle travels with a low air pressure in the tire or with extremely heavy duty use and heavy deflection of the tire. The normal air pressure is not less than 6 $Kg/cm^2$ for heavy duty truck and bus tires. The tire must be strong enough to endure such a relatively high pressure and the cord diameter should be adjusted correspondingly in the case where a reduced number of plies is used. Therefore, the cord diameter is the second problem which has to be addressed.

Moreover, in constructing the carcass, it is important how far respective ones of the ply cords are spaced from one another, particularly in the case of a small number of plies, though research activities so far have not been focused on that problem. In other words, for a small number of plies, a spacing between the cords, i.e., a center-to-center distance of the cords should be selected so as to maximize durability. The cord spacing is then the third issue addressed.

If the cord diameter is made greater with regard to the second problem addressed above, it becomes a requirement for preventing separation at the cutting edge of the ply cords turned up around the bead cores to have a precise cord spacing. When the carcass ply cords are made of high denier cord material, concentrated stress occurs at the cutting edge portion of the ply cords during tire running and causes the separation.

SUMMARY OF THE INVENTION

It is therefore an object of the present invention to enhance the durability of a carcass ply by making a carcass ply of polyester cords and using a number of plies so as to not cause differences in the degree of reduction in strength, adhesion and other properties of the ply cords.

Another object of the present invention is to enhance the durability of the carcass ply by selecting a denier number of the polyester cords which ensures sufficient strength for enduring a higher pressure without any adverse effects when a small number of plies is used.

Another object of the present invention is to increae the strength of the ply cords and the adhesion to rubber compound and thus the durability of the carcass ply by selecting a proper spacing between the respective cords in the ply layers, that is, a center-to-center distance between the cords, with respect to cord diameter of between the cords.

Still another object of the present invention is to the enhance separation resistance near the cutting edge of the ply cords which are turned up around the bead cores.

One significant feature of the present invention is that the number of plies of the polyester cords is limited to 2 plies to take into account the relationship between the number of plies and retention coefficient of strength of the carcass ply cords and the adhesion strength between the carcass plies after the tire has been run.

Another important feature of the present invention is that the denier number of the polyester ply cords within the two ply structure is not less than 4500d. To reduce local deterioration in the 2-ply structure to a minimum even under high deflection and prevent separation due to insufficient thickness of rubber, the spacing between the cords, that is the center-to-center distance of the cords in the first and second plies, is nearly 1.2–1.7 times as large as the cord diameter at approximately the maximum tire width. The edge portion of the ply cords is covered with the same rubber as the ply coating rubber which has tight adhesion to the polyester cords to achieve an improvement in separation resistance at the cutting edge of the ply cords which are turned up around the bead cores. An extension of the edge covering rubber from the edge of the ply cords is three times or more as large as cord diameter.

DETAILED DESCRIPTION OF THE INVENTION

Figure 1:
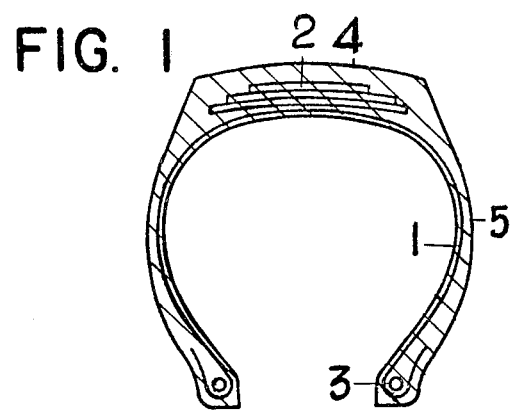
FIG. 1 is a cross sectional view of a conventional heavy duty radial tire with steel cord carcass plies.
Figure 2:
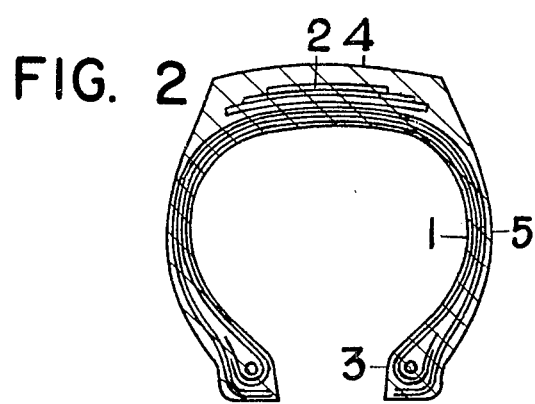
FIG. 2 is a cross sectional view of a conventional heavy duty radial tire having a multi-layer structure with a textile cord carcass ply.
Figure 3:
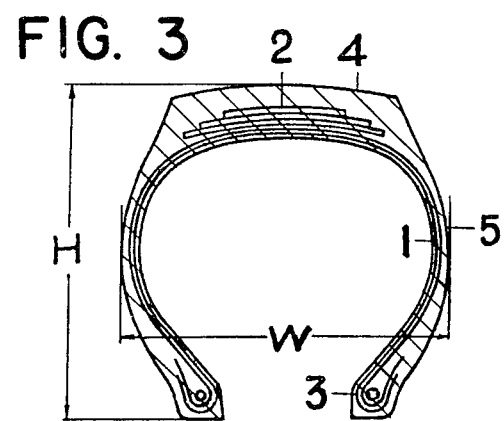
FIG. 3 is a cross sectional view of a heavy duty radial tire of the present invention, which has a two-ply structure using polyester cords.
Figure 4:
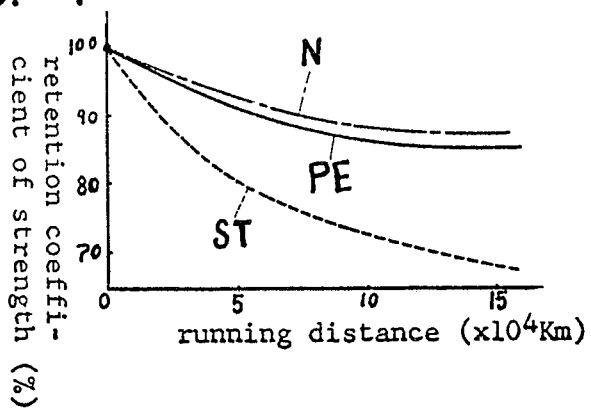
FIG. 4 is a graph showing the retention coefficients of strength of steel cords, nylon cords and polyester after tire running, for comparison purposes.

Referring to FIGS. 1 through 3, a carcass ply is designated by the number 1, a steel belt layer is the 2, bead cores are 3, a tread is the 4, and side walls are designated 5. (H) is tire height and (W) is maximum tire width. FIG. 1 illustrates show a conventional heavy duty radial tire which contains a single-ply carcass ply made of steel cords. FIG. 2 illustrates another type of conventional heavy duty radial tire having a multi-ply carcass ply made of textile cords and generally up of four to six plies each consisting of 2000–3000 denier nylon cords. FIG. 3 depicts a two-ply tire structure embodying the present invention wherein high denier polyester cords, for example, greater than 4500 denier polyester cords, are employed. FIG. 4 the retention coefficients of strength of respective ply cords after tire running when the carcass plies are composed of steel cords (ST), nylon cords (N) and polyester cords (PE). Curves shown therein trace the lower limit values of strength reduction among many measured values. It is apparent from FIG. 4 that the nylon cords (N) and polyester cords (PE) retain nearly 85 percent of ply cord strength of a new tire with the accompanying index of strength being less than 15 percent, whereas the steel cords (ST) retain about 70 percent of strength of a new tire with a strength reduction of as much as 30 percent. Dissection of the steel cord tire revealed a lot of broken or disconnected steel cords in close proximity to the region where the cords suffered 25–30 percent of loss of strength. Such strength reduction and disconnection of steel cords were due primarily to a high degree of materials deterioration caused by development of rust and due to abrasion among fine filaments which is caused by repeated strain during tire running. Accordingly, in contrast with the tires having the carcass plies made of the nylon cords and polyester cords, the steel cord tire failed to endure the air pressure and ruptured suddenly during tire running. It was thus concluded that steel cords were an improper material for use as the ply cords of heavy duty radial tires.

Figure 5:
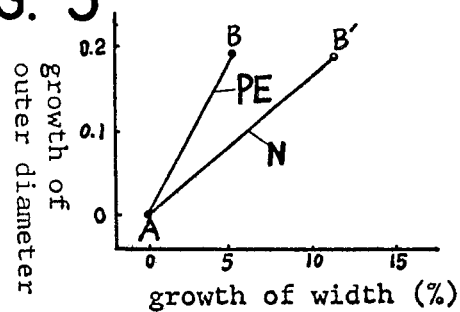
FIG. 5 is a graph showing the degree of difference in tire dimension between at vulcanization-molding and at air pressure charging for a nylon cord tire and a polyester cord tire.
Figure 6:
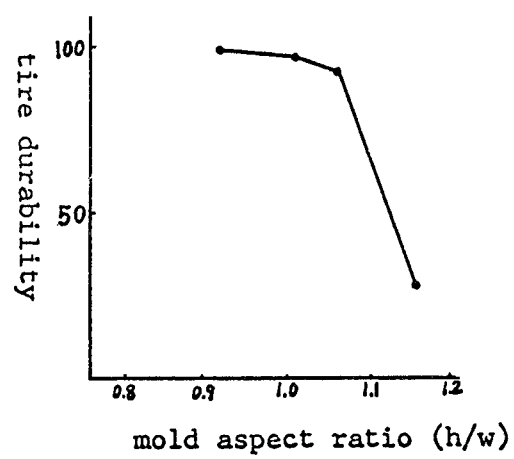
FIG. 6 is a graph showing the relationship between the mold aspect ratio (h/w), i.e., the ratio of tire height (h) to tire width (w) at vulcanization-molding and tire durability.

As seen from FIG. 5, a comparison was made between the nylon cord tire (N) and polyester cord tire (PE) in terms of differences in tire dimension between vulcanization-molding and at air pressure charging. In the case where the carcass plies are made of textile cords, it is known that the ply cords stretch because of the tension caused by the air pressure and thereby varies the dimension. In particular, heavy duty tires with more than 6 Kg/cm$^2$ of charged air pressure are especially susceptible to substantial variations in tire dimension. Steel-belted radial tires suppress the growth in the outer diameter, so stretching of the ply cords occurs as a substantial increase in the width of the tire. As shown in FIG. 5, the nylon cords and polyester cords were compared with respect to the degree of stretching in both, the directions of the outer diameter and the width. In FIG. 5, the point A denotes dimensions (outer diameter and width) at vulcanization-molding, whereas the points B and B' denote stretching of the polyester cord tire (PE) and the nylon cord tire (N) after charging of an air pressure. The extensions (B) and (B') of the polyester cords (PE) and nylon cords (N) were also identical in the direction of the outer diameter. While the polyester cords (PE) stretched about 5 percent in the direction of width, the nylon cords (N) stretched as much as 11 percent which was twice that of the polyester cords. With heavy duty tires usually used in a dual-wheel fashion, the employment use of the nylon cords caused an increase in tire width and objectable contact at opposite sides of the tires. Therefore, the nylon cords were not desirable for use in heavy duty radial tires. However, a remedy employed so that the heavy duty dual-wheel radial tires of the nylon cords could be used was to use a mold of a somewhat narrower width thereby taking into account the appropriate tire width at the air pressure charging. In other words, the tire width (W) was made narrower with respect to tire height (h) within the mold thus increasing the mold aspect ratio (h/w). FIG. 6 represents the relationship between the mold aspect ratio (h/w) and tire durability, indicating that tire durability fell due to a reduced separation resistance when the mold aspect ratio was increased beyond a given limit. This implied that it was more desirable to employ the polyester cords to meet the requirements of the carcass plies of heavy duty radial tires.

Figure 7:
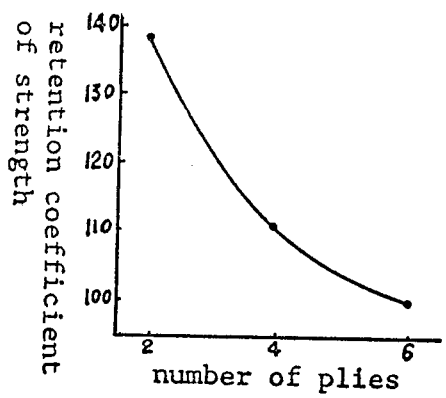
FIG. 7 is a graph of the relationship between the number of plies and retention coefficients of strength of carcass ply cords after tire running, for a polyester cord tire.
Figure 8:
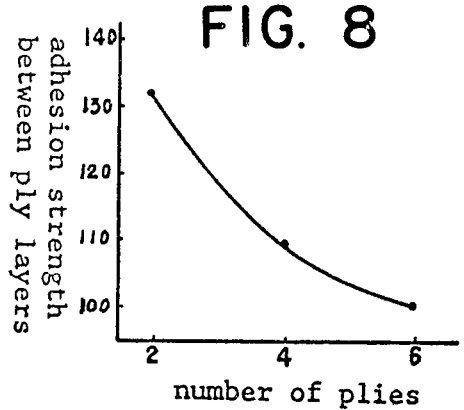
FIG. 8 is a graph of adhesion strength between carcass plies after tire running, as a function of the number of plies, for a polyester cord tire.

The relationship between the number of the carcass plies and durability is shown in FIGS. 7 and 8. FIG. 7 shows the relationship between the number of carcass plies and the retention coefficients of strength of the carcass ply cords after tire running, representing the results of drum tests conducted on two-ply, four-ply and six-ply tires under extremely high deflection conditions or low pressure conditions to promote deterioration of the ply cords for investigation of the dependency of cord fatigue of the carcass plies after tire running the number of plies. Tension resistance of the polyester ply cords was measured with test tires of 10.00 R 20, 14 PR, having an air pressure of 1.5 Kg/cm² and a load of 2376 Kg, after traveling 2000 Km. Retention coefficients were calculated in index fashion. The denier number of the carcass plies in the respective plies was selected so as to equalize the unit strength, e.g. 9000d×2 plies, 3000d×4 plies and 2000d×6 plies. It was concluded that the strength of the two-ply tire was about 40 percent greater than the six-ply one and about 30 percent greater than the four-ply one. In other words, the two-ply tire had outstanding improvements in strength retention of the ply cords over the 4 and 6 ply type. FIG. 8 shows the dependency of the adhesion strength on the number of plies using the same test tires as described with respect to FIG. 7. Adhesion strength of the two-ply tire was about 30 percent greater than the six-ply one and about 20 percent greater than the four-ply one, thus showing that the two-ply tire was greatly superior to the other type tires in not only tension resistance as best seen from FIG. 7 but also in terms of the adhesion strength.

As stated above, selection of the two-ply carcass was recommended to best meet the cord strength and adhesion strength requirements within the various multi-ply tires. Nevertheless, to maintain a charged air pressure, the ply strength per unit should be kept above a minimum given limit. That is, it is necessary to maintain substantially the same strength per unit width as in other multi-ply structure tires. To this end, increased cord end count and increased cord diameter are needed together with a minimum cord spacing which is necessary for satisfactory durability. For example, for 7.50 R 16, 14 PR tires (Japanese Industrial Standard (JIS) air pressure 7 Kg/cm²), nearly 1100 Kg/2.5 cm of ply strength is required around approximately the maximum tire width. Conventional polyester cords needs 1000d/2 (the cord denier number: 2000) and four plies. In this instance, the minimum cord spacing near the bead cores is about 0.4 mm. Contrary to the case where the carcass ply number of the polyester cords was two as described above, 1500d/3 (the cord denier number: 4500) and two plies are needed to obtain an optimal cord spacing necessary for satisfactory durability. In this instance, the required cord spacing near the bead cores was nearly 0.3 mm to achieve satisfactory durability.

For example, for 10.00 R 20, 14 PR (JIS. air pressure, 7.25 Kg/cm²) tires, nearly 1600 Kg/2.5 cm of ply strength is necessary at the neighborhood of the maximum tire width. In this instance, while conventional polyester cords need 1000d/2 (the cord denier number: 2000) and six plies, 1500d/2/3 (the cord denier number: 9000) and 2 plies were satisfactory for use in the present invention. The minimum cord spacing near the bead cores was about 0.3 mm with a resulting satisfactory durability. Therefore, in the case where the carcass ply number was limited to two, pursuant to the teachings of the present invention, satisfactory durability was attained through the utilization of the polyester cords having a cord denier number of not less than 4500d.

Figure 9A:
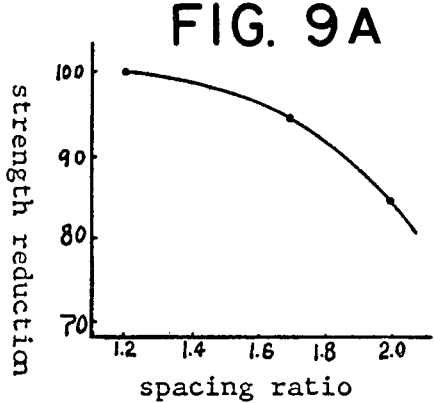
FIG. 9(a) is a graph of the dependency of the index of strength reduction in ply cords on the spacing ratio (S/D) of ply cords as defined in FIG. 9(b), for a tire having a two-ply carcass ply structure using polyester cords in accordance with the present invention.
Figure 9B:
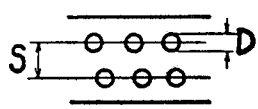
Figure 10:
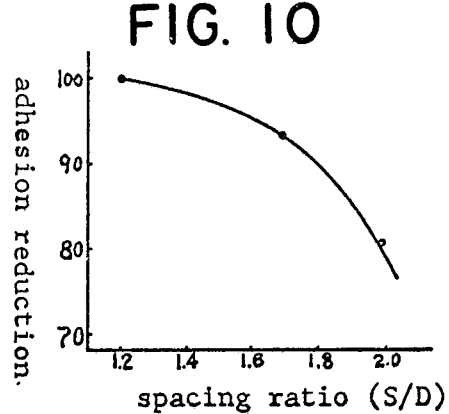
FIG. 10 is a graph of the dependency of the index of adhesion reduction in ply cords on the spacing ratio (S/D) of the ply cords as in FIG. 9.

FIGS. 9 and 10 show the dependency of durability upon a ratio (S/D) of the ply-to-ply cord spacing (S) to the cord diameter (D), wherein the cord-to-cord distance from the first ply to the second ply was measured in proximity to the maximum tire width (W) shown in FIG. 3. FIG. 9(a) shows the dependency of the strength reduction in the ply cords upon the ratio (S/D) of the ply-to-ply cord spacing to the cord diameter as defined in FIG. 9(b). The strength of the ply cords was examined with 10.00 R 20, 14PR test tires, 1.5 Kg/cm² of air pressure, 2376 Kg of load, and 2000 Km distance traveled as in the above case. Durability declined within the limits of 1.2 of the ratio (S/D) of the ply-to-ply cord. A spacing between the ply cords is preferably around 1.2–1.7 times as large as the cord diameter.

Figures 11A, 11B:
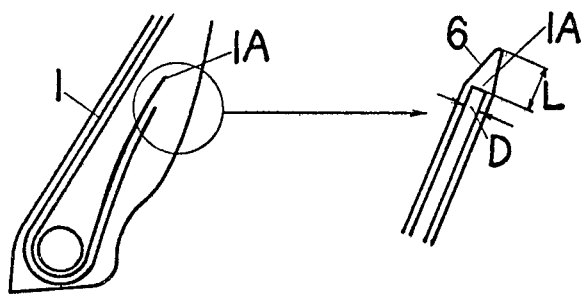
FIG. 11(a) is an illustrative diagram of the cutting edge of the ply cords used in the present invention and FIG. 11(b) is a partially enlarged view of FIG. 11(a).

FIG. 10 shows the dependency of the adhesion reduction on the ply-to-ply cord spacing ratio (S/D) examined under the same test conditions as in FIG. 9. It was discovered that as the ply-to-ply cord spacing was increased, the degree of reduction in adhesion was increased within the limits of S/D=1.2. It is preferable that the ply-to-ply cord spacing at the maximum tire width (W) be about 1.2–1.7 times as large as cord diameter. As noted earlier, when the carcass plies were made having thick cords of more than 4500 denier, there was the possibility of separation near the cutting edge of the ply cords which are turned up around the bead cores. In accordance with the present invention, the cutting edge of the cords is covered with the same rubber and has as good an adhesion with the polyester cords as the coating rubber of the ply cords. The test results showed that separation can be substantially suppressed by that the length of the edge coating rubber from the end of the cords is three times or more as large as cord diameter. As best seen from FIG. 11, the turned up ply cord end (1A) is covered with an extension (L) of the carcass ply coating rubber (6) which is three times or more as large as the cord diameter (D).

Test tires of 10.00 R 20, 14 PR were subjected to drum tests with about 3400 Kg and 10000 Km of distance traveled and thereafter disassembled for examination of the edge portion of the ply cords. A separation of nearly 8 mm occurred when the end of the ply cords was not covered with a coating rubber, and separation of nearly 2 mm occurred when the extension of the coating rubber from the end of the ply cords is less than 1 mm, whereas less or no separation occurs when the extension is as much as 3 mm. In this instance, the cord diameter (D) was nearly 1.1 mm. Thus, satisfactory results were obtained when the extension (L) of the coating rubber was at least three times as large as cord diameter (D) (L>3D).

What is claimed is:

1. A heavy duty radial tire for use on large equipment such as trucks and buses, said radial tire comprising:
a carcass structure having two plies which are made of polyester cords having a fineness of no less than 4500 deniers, and a ply-to-ply cord spacing from the first ply to the second ply of between 1.2 to 1.7 times the cord diameter at the maximum tire width, said carcass ply cords being coated with rubber and said tire having bead cores with the end portions of said carcass ply cords being turned up around said bead cords and being covered with said rubber coating of said carcass ply cords, said rubber coating on said carcass ply cords extending beyond the ends of said cords at least three times the diameter of said carcass ply cords.

2. A heavy duty radial tire as claimed in claim 1, wherein said tire further comprises at least one steel belt circumferentially located within said tire around said two plies.

* * * * *